United States Patent [19]

Randall

[11] 4,037,650
[45] July 26, 1977

[54] THERMAL STORAGE APPARATUS

[75] Inventor: John Edward Randall, Wirral, England

[73] Assignee: National Research Development Corporation, London, England

[21] Appl. No.: 580,224

[22] Filed: May 23, 1975

[51] Int. Cl.² .................. F25B 27/02; G05D 23/00; C09K 3/18; C09K 5/00

[52] U.S. Cl. .................. 165/29; 62/238; 165/DIG. 17; 237/2 B; 252/67; 252/70

[58] Field of Search .................. 252/67, 70; 126/400; 237/2 B; 62/238; 165/18, 29, DIG. 17

[56] References Cited

U.S. PATENT DOCUMENTS

| | | | |
|---|---|---|---|
| 2,619,326 | 11/1952 | McLenegan | 62/238 |
| 2,723,083 | 11/1955 | Bary | 62/238 |
| 2,915,397 | 12/1959 | Telkes | 126/400 |
| 3,191,392 | 6/1965 | Donnelly | 252/67 |
| 3,370,420 | 2/1968 | Johnson | 165/DIG. 17 |
| 3,935,899 | 2/1976 | Jolly | 165/29 |
| 3,958,101 | 5/1976 | Barabas | 252/70 |

Primary Examiner—Carlton R. Croyle
Assistant Examiner—G. P. La Pointe
Attorney, Agent, or Firm—Edmund M. Jaskiewicz

[57] ABSTRACT

A thermal storage apparatus comprising two thermal storage vessels, each thermal storage vessel containing a thermal storage medium, one medium being capable of being maintained at a temperature in excess of a pre-selected temperature, and the other medium being capable of being maintained at a temperature below the pre-selected temperature, a refrigeration system being provided for transferring heat from the storage medium at the lower temperature to the storage medium at the higher temperature.

13 Claims, 7 Drawing Figures

THERMAL STORAGE APPARATUS

The present invention relates to thermal storage apparatuses and, more particularly, to thermal storage apparatuses having two thermal storage vessels which are adapted to be maintained at different temperatures, the heat stored in either of these two vessels being transferable to the other vessel.

Certain types of thermal storage apparatus have been known for some time. Thus, for example, electrical storage heaters are known. Such heaters have been designed primarily for markets in which electricity is obtainable on a two-tier tariff. The storage heater is supplied with electricity when the cheaper tariff is in operation. The electrical energy supplied to the heater is converted into heat energy and is stored. Ideally, this stored heat is used for space heating when the dearer electricity tariff is in operation. Thus, such heaters are generally supplied with electricity overnight and used for space heating during the day. However, an apparatus of this type has the disadvantage that it can only be used for heating purposes. It is not possible to use the apparatus to cool a room.

Attempts have been made to overcome this problem. Thus, in U.S. Pat. No. 3,236,294, a system capable of producing, at different times, both heating and cooling is described. This system comprises a heat storage bin in the form of a water drum surrounded by rocks. The drum and the rocks are not thermally insulated from one another, and so cannot be regarded as two separate stores. The heat storage bin can be used for storing heat at any desired temperature. Thus, if such a system is installed in a house, and, the ambient external temperature is greater than the temperature at which it is desired to maintain the interior of the house, heat may be extracted from the atmosphere and stored in the storage bin. This stored heat can then be used at a later time for heating the interior of the house when the external ambient temperature falls. Conversely, if the external ambient temperature is below that of the interior of the house, the bin can be employed to store low temperature heat. This low temperature heat can then be used for cooling the interior of the house when the external ambient temperature rises. Thus, the bin of this system can be employed for storing heat at any desired temperature. Such a system has two major disadvantages. Firstly, the system cannot be used to store heat at two different temperature levels simultaneously. This is disadvantageous when the house is in a location in which there are large short-term fluctuations in temperature, since the system cannot be used to both heat and cool the building within a short period of time. Secondly, when the bin is in use as a cold store, a refrigeration system must be employed to maintain the temperature of the bin at a sufficiently low level. As is well known, heat is absorbed by a refrigerant in the refrigeration circuit, which heat is rejected. This is obviously wasteful. Accordingly, the system disclosed in this United States specification can be regarded as a thermal storage apparatus which can be used for either space heating or space cooling. The heating and cooling effects of such a system can therefore be effectively regarded as two independent uses of the same apparatus. Thus, utilising such a system, heat can be extracted from a room and the room is thus cooled. This heat is discharged to the external atmosphere and cannot be stored for re-heating the room when desired.

In the U.S. Pat. No. 3,262,493, a thermal storage apparatus having two thermal stores is disclosed. One of the stores is used for storing heat at a temperature in excess of the temperature at which it is desired to maintain the interior of a space, such as the interior of a building, whilst the other store stores heat at a temperature below the ambient temperature of the space. In such a system, heat is collected from the atmosphere by means of solar cells. This heat is transferred to the store for high temperature heat and stored therein. This stored heat can then be used at a convenient time for heating the space. When the ambient external temperature drops, the stored heat is fed from the store into the room. To cool the room, heat is collected from the room, generally by a heat transfer medium, and is collected in a cold store. As and when desired, this heat is rejected from the cold store to the external atmosphere. Alternatively, for example at night, the external atmosphere may be allowed to cool the cold store. Since the cold store is now colder than the room, heat can be allowed to flow naturally from the room to the cold store, thereby cooling the room. It will be readily apparent that the cold store can be used for cooling a room during a hot period, for example during summer months. The cold store may be allowed to reach a comparatively low temperature when the external temperature is low. Depending upon its storage capacity, the cold store may be used as a dump for heat from a room during a heat period. The thermal storage apparatus of this United States specification differs from that disclosed in U.S. Pat. No. 3,236,294 in that two separate systems are provided for heating and cooling. However, the two systems are substantially independent of one another. Accordingly, there is no method of upgrading heat, that is to say, heat absorbed by the cold store cannot be transferred to the hot store. This effectively means that heat absorbed in the cold store cannot be used, as and when desired, for heating a room. Moreover, the thermal storage apparatus disclosed in U.S. Pat. No. 3,262,493 employs natural heat. The hot store is supplied with its heat from solar radiation, and the cold store is maintained at a low temperature by a low ambient external temperature. The heating or cooling effect obtainable using the apparatus described in the U.S. Pat. No. 3,262,493 is therefore restricted. The reliability of operation of this prior art system is very much dependent upon the weather pattern in the area in which the system is employed being substantially consistent over a period of years. If such a weather pattern does not materialise, problems may well arise in maintaining the room or building at a desired temperature. Alternatively, very large stores must be employed to ensure that the system can cope with alternating demands.

It is therefore an object of the present invention to overcome the difficulties and disadvantages in the two thermal storage apparatuses described above, and to make it possible to stabilise the temperature in a room, particularly when the temperature range within the room, under normal circumstances, would otherwise fluctuate considerably on either side of the proposed stabilised temperature. By means of the present invention, it has surprisingly been found that it is possible for substantially all of the heat absorbed by a cold storage vessel in cooling to be transferred, in a comparatively simple manner, to a hot storage vessel. This heat which has been transferred can be used at any convenient time.

This ability of the system of the present invention to transfer heat from the cold storage vessel to the hot storage vessel has numerous advantages. Basically, in known systems, heat is obtained from a source, stored, and then utilised when convenient. No conscious attempt has been made to recycle heat. Thus in a domestic refrigerator, a refrigerant cools the interior of the refrigerator. The heat removed from the refrigerator is merely discharged by radiation from conduits at the back of the refrigerator. No attempt has hitherto been made to utilise this heat. Similarly, the use of a heat pump is known to transfer heat from a cold source to a hot source. Thus, for example, it is known to take water from a river and pass the water through a heat pump. The heat extracted therefrom can be used to heat a building. In so doing, the temperature of the water is lowered. The cooled water is then returned to the river despite the fact that it could be used to cool the building if the internal temperature thereof rose above a certain level.

However, by using the apparatus of the present invention, heat can be recycled. Suppose, for example, the system of the present invention is being used to cool a room. Air is passed through the storage vessel which is at the lower temperature. In so doing, the temperature of this cold store would tend to rise. However, by utilising a refrigeration system, the heat absorbed in the cold store can be transferred to the storage vessel which is at the higher temperature, that is to say, the hot store. The hot store can store this heat, which can then be utilised to heat the room as and when desired. Conversely, when this heat is being used to heat the room, the temperature of the hot store would tend to drop. However, the hot store absorbs heat from the refrigerant. The thus cooled refrigerant thus cools the cold store, which can then be utilised for cooling the room when desired. It can therefore be seen that heat can be recycled.

Moreover, by the provision of two separate stores, heating or cooling are available at substantially any time. Thus, the system of the present invention can be utilised even in conditions where short-term fluctuations of weather take place.

Whilst both refrigeration systems and thermal storage apparatuses are known, the system of the present invention utilises seemingly simple combination of these two integers to provide a thermal storage system which produces advantages which could not be foreseen. Thus, heat may be recycled. This is a feature which is of paramount importance in the current energy shortage. Moreover, the system of the present invention still permits the use of natural heating or cooling of the stores.

According to the present invention, there is provided a thermal storage apparatus comprising a first thermal storage vessel containing a first thermal storage medium which is capable of being maintained at a temperature below a pre-selected temperature, a second thermal storage vessel containing a second thermal storage medium, which is capable of being maintained at a temperature above said pre-selected temperature, and a refrigeration system for transferring heat from said first storage vessel to said second storage vessel.

In a preferred embodiment of the present invention, the second thermal storage vessel contains a plurality of containers each containing the thermal storage medium in the form of at least one crystallisable salt hydrate selected from the group consisting of trisodium (ortho) phosphate dodecahydrate, a mixture of trisodium (ortho) phosphate dodecahydrate and disodium hydrogen (ortho) phosphate dodecahydrate, sodium carbonate decahydrate, sodium sulphate decahydrate, and a mixture of hydrated sodium silicate and sodium carbonate decahydrate, a first storage vessel, a plurality of containers in said first storage vessel, each said container containing the thermal storage medium selected from the group consisting of water, an aqueous solution of a salt, a crystallisable salt hydrate and a mixture of crystallisable salt hydrates, said storage medium in said first storage vessel having the characteristic of solidifying with the evolution of heat at a temperature below a preselected temperature, said temperature being below the crystallisation temperature or temperatures of said storage medium in said second storage vessel, and a refrigeration circuit containing a refrigerant, said refrigeration circuit comprising, in series, an evaporator, a compressor, a pressure reduction device and a heat exchanger, said heat exchanger being located within said second storage vessel and said evaporator being located within said first storage vessel. The term "crystallisable" as used throughout this specification must be construed as also including the salt hydrate in its crystallised form.

By providing a refrigeration system, heat which is absorbed in the first or cold storage vessel when a room is being cooled by the apparatus can be transferred to the second or hot storage vessel for use at a convenient time for heating the room. By using both a hot storage vessel and a cold storage vessel and a refrigeration system the refrigeration system can be operated continuously, even though heating and cooling are required only intermittently.

It will be readily apparent to those skilled in the art that there are several advantages in using a heat pump which can be operated continuously instead of intermittently. Thus, for example, a room which faces the sun during a major portion of the day may receive as much as ten kilowatts of solar radiation. Obviously, the temperature within the room would, under normal circumstances, rise considerably. To maintain the temperature of the room at a desired level, some form of refrigeration system is required to remove the heat produced by the solar radiation. In the absence of the present invention, this normally entails the use of an air-conditioning system embodying a refrigeration system. At the time when the heating effect produced by the solar radiation is at a maximum, this refrigeration system may need a power input rated as highly as 3 kilowatts. However, the full capacity of the refrigeration system is only utilised for a brief period of time, of the order of perhaps half to one hour. Obviously, therefore, the refrigeration system will be working at less than its full capacity for much of the day. It is well known that practical difficulties arise in operating a refrigeration system at reduced capacity, unless the system is very refined, and therefore very expensive. With the present invention, however, by using two thermal storage vessels, one at a high temperature and one at a low temperature, the maximum power input required in the same ambient conditions can be reduced to something of the order of 0.5 kilowatts. Obviously, a refrigeration system having a maximum power input of 0.5 kilowatts is smaller, cheaper and quieter in operation than one having a maximum input of 3.0 kilowatts. Moreover, with the present invention all of the heat absorbed by the refrigeration system can be used at a later time, as and when convenient.

The high temperature thermal store may contain any suitable medium which can be heated easily but which cools only slowly under natural conditions. Accordingly, as is well known, the criteria for thermal storage materials such as that contained in the hot store are that (a) it has a high specific heat capacity or latent heat (b) a high density (to give a low volume) and (c) a high thermal conductivity. In a particularly preferable embodiment of the present invention, the medium contained in the first storage vessel is a crystallisable salt hydrate. It is well known that when most salt hydrates crystallise, heat is evolved. It will be readily apparent that it would be advantageous to use this heat of crystallisation. It has been found particularly advantageous if the salt hydrate is selected from the group consisting of sodium carbonate heptahydrate, sodium carbonate decahydrate, sodium sulphate decahydrate, disodium hydrogen phosphate heptahydrate, disodium hydrogen phosphate dodecahydrate, sodium thiosulphate heptahydrate, sodium acetate trihydrate, calcium chloride heptahydrate and trisodium(ortho)phosphate dodecahydrate. Alternatively, mixtures of these compounds may be used.

Similarly, it is advantageous for the cold store to contain a freezable liquid. The term "freezable liquid" as used through this specification is to be construed as also including the liquid when in its frozen or solid state. Thus, for example, the cold store may contain water. By using a freezable liquid the latent heat of fusion of the liquid can be extracted, and transferred to the hot store. The term "freezable" is intended to encompass crystallisable salt hydrates, or mixtures thereof, which crystallise at suitably low temperatures. When using such compounds, the heat of crystallisation is extracted, and not the latent heat of fusion. However, since the latent heat of fusion and the heat of crystallisation are both types of heat produced when a liquid solidifies, compounds which produce such an effect are referred to in this specification as "freezable liquids". It has been found that a eutectic mixture of salt hydrates, particularly a eutectic mixture of hydrates of sodium sulphate and ammonium chloride are particularly suitable. Alternatively, waterglass may be used as the freezable liquid. Whilst the chemistry of waterglass (sodium silicate) is extremely complex, it is believed that this compound may well form single or mixed hydrate crystals if the waterglass is heated and then cooled. Accordingly, for the purposes of this specification, the term "crystallisable salt hydrate" is to be interpreted as including waterglass. If the freezable liquid is water, it may have mixed therewith an oil or other water immiscible liquid. A portion of this water-immiscible liquid may be extracted, cooled and re-injected into the water. By so doing, the oil acts as a heat transfer medium and, if sufficiently cold, can act as an initiator for freezing of the water. Alternatively, a polyhydric alcohol such as ethylene glycol or glycerol or a salt may be added to the water. By so doing the water does not freeze hard. This is of importance if the water is in a sealed container since the freezing thereof would set up considerable expansion force.

The thermal storage apparatus in accordance with the present invention may additionally be provided with means for forcing air flow over and/or through one or both of the storage vessels. Additionally, one or both storage vessels may in addition be provided with heating means, which heating means may comprise an electrical heating element. The refrigeration system is preferably of the vapour compression type, but may alternatively be of the thermo-electric type (operating on the Peltier principle) or of the absorption type.

Embodiments of the invention will be further described by way of example, with reference to the accompanying drawings in which:-

FIGS. 1 and 2 each show a schematic view of a thermal storage apparatus in accordance with the present invention, the two figrues showing substantially identical systems, with the sole exception of the contents of the storage vessels;

Figure 1:
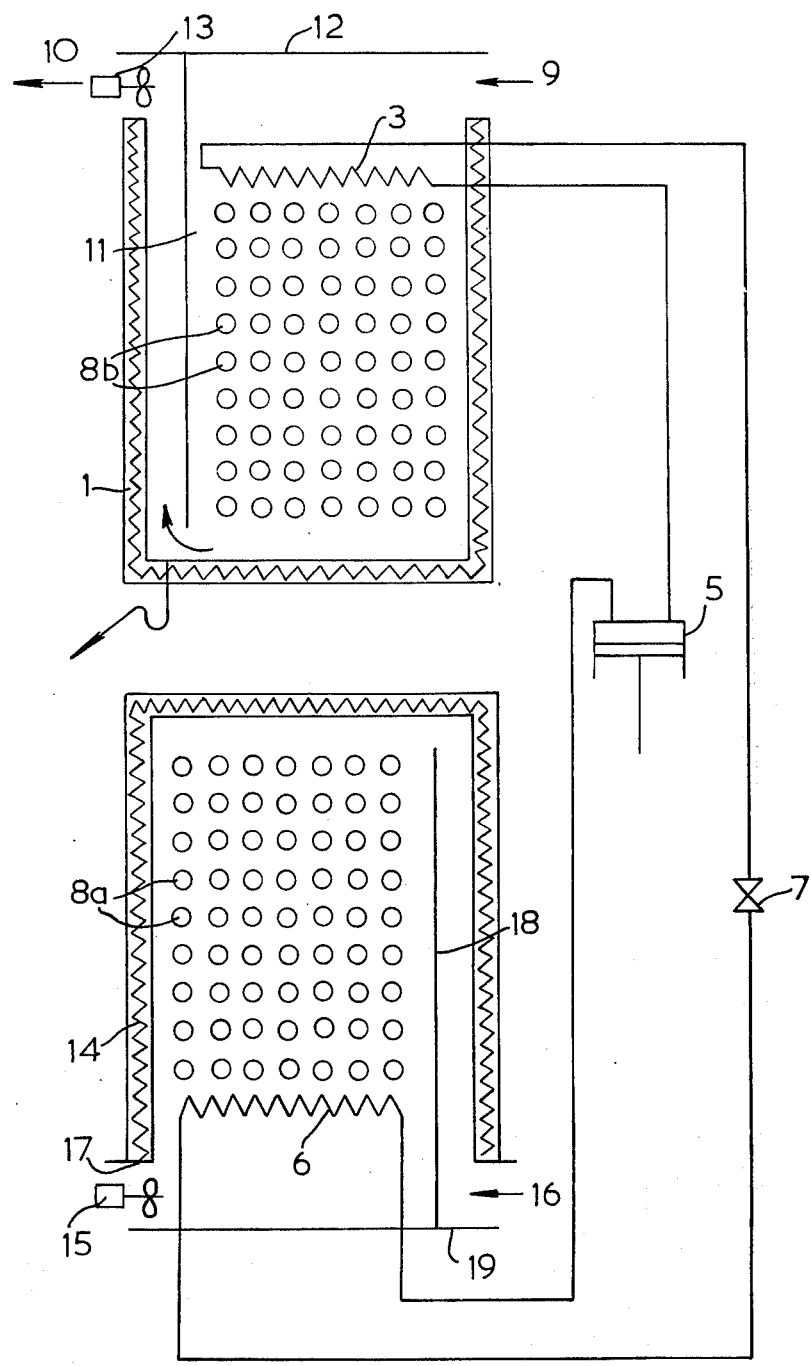

In FIG. 1, thermal storage apparatus comprises a first thermal storage vessel 1 within which are located containers 8b. The containers contain a freezable liquid which may be water or a suitable crystallisable salt hydrate, or mixture of hydrates, which crystallises at a suitably low temperature or temperatures. For the sake of clarity, it will be assumed that the containers 8b contain water. These containers 8b are sealed.

The storage vessel 1 also has an air inlet 9 and an air outlet 10. As shown, both the inlet 9 and the outlet 10 are at the upper end of the storage vessel 1. Between the inlet 9 and the outlet 10, a baffle 11 is provided. This baffle 11 may advantageously be integrally formed with a cover 12 for the storage vessel. Within the storage vessel 1, spaces are provided between the containers 8b to allow air to pass therearound. A fan 13 is provided to draw air through the storage vessel 1, the baffle 11 preventing air from flowing directly from the inlet 9 to the outlet 10 without passing over the containers 8b.

Also located within the storage vessel 1 is an evaporator 3 forming part of a refrigeration circuit. A refrigerant fluid flows through the evaporator 3. The evaporator is in series with a compressor 5 and heat exchanger 6. This heat exchanger 6 is located within a second storage vessel 14. The second storage vessel 14 is, in essence, extremely similar to the storage vessel 1. The containers 8a within the storage vessel 14 contain a crystallisable salt hydrate. Alternatively, these containers 8a may be filled with a crystallisable salt hydrate plus water.

As with the storage vessel 1, a fan 15 is provided to draw air through the storage vessel 14. In the storage vessel 14, it will be noticed that the air inlet 16 and the air outlet 17 are both located at the bottom of the vessel. A baffle 18, which may be integrally formed with a base plate 19 is provided between the inlet 16 and the outlet 17. The purpose of this baffle 18 is to prevent air passing directly from the inlet 16 to the outlet 17 without passing over the containers 8a.

The operation of the illustrated apparatus will now be described. The storage vessel 1 is maintained at below the desired room temperature and so may be regarded as a "cold" store whilst the storage vessel 14 is maintained at above the desired room temperature and so may be regarded as a "hot" store. Assuming for the moment that the compressor 5 is operating, the refrigerant fluid flows through the evaporator 3 in the storage vessel 1. In so doing, the refrigerant fluid extracts heat from the freezable liquid contained in the containers 8b located in the storage vessel 1. This causes the freezable liquid to freeze and the refrigerant fluid to be heated. The heated refrigerant fluid passes through the compressor 5, and then through the heat exchanger 6 located in the storage vessel 14.

Passage of the refrigerant through heat exchanger 6 causes the crystallisable salt hydrates contained in the containers 8a in the storage vessel 14 to become heated. The crystallisable hydrates mentioned hereinbefore all have one common characteristic. This characteristic is that they lose some of their water of crystallisation when heated, and, on cooling, they recrystallise with the evolution of considerable quantities of heat. Thus, when heated by the refrigerant fluid, the crystallisable salt hydrates will lose at least some of their water of crystallisation.

A pressure reduction device 7 is located, in the refrigerant circuit, between the external heat exchanger 6 and the evaporator 3.

The compressor 5 may be run in dependence upon load conditions. Thus, it can be run when electricity is cheap, for example, at night, and then be switched off. Alternatively, it may be run continuously. For the sake of example, it will be assumed that the compressor 5 has been run until substantially all of the freezable liquid contained in the containers 8b within the storage vessel 1 have frozen and all of the crystallisable salt hydrate contained in the container 8a located in the storage vessel 14 have been heated until they are at a temperature which is above their crystallisation temperature.

As already indicated, the thermal storage apparatus of the present invention can now be used for supplying either heated air or cooled air to a room. Suppose, for example, that it is desired to supply heat to the room. This is done by switching on the fan 15 in the storage vessel 14 to draw air over the heated containers 8a and to supply it to the room. The air flow over the containers 8a means that the temperature of the contents of these containers 8a will commence to fall. At a certain temperature, the salt hydrates will begin to recrystallise. As previously mentioned, when such recrystallisation takes place, relatively large quantities of heat are evolved. The temperature of the containers 8a will remain constant, or fall slowly, until substantially all of the hydrate has recrystallised. Accordingly, heat may be supplied to the room for a relatively lengthy period of time.

If on the other hand, it is desired to cool the room, then the fan 13 in the storage vessel 1 is switched on instead of switching on fan 15. The fan 13 causes air to flow over the containers 8b within the storage vessel 1. In so doing, the air will be cooled, and the fan further directs air to the room to be cooled.

The heat given up by the air in passing over the containers 8b will be absorbed by the freezable liquid. In due course, the freezable liquid will commence to melt. If the freezable liquid is water, the latent heat of fusion of ice is absorbed by the water thus contributing to the cooling of the air passing thereover and/or enabling a larger quantity of air to be cooled to the desired temperature than before. The large quantity of air to be cooled may, for example, be extracted from a room which has been heated by the sun. The ice may also be melted by use of an additional heating element.

Figure 2:
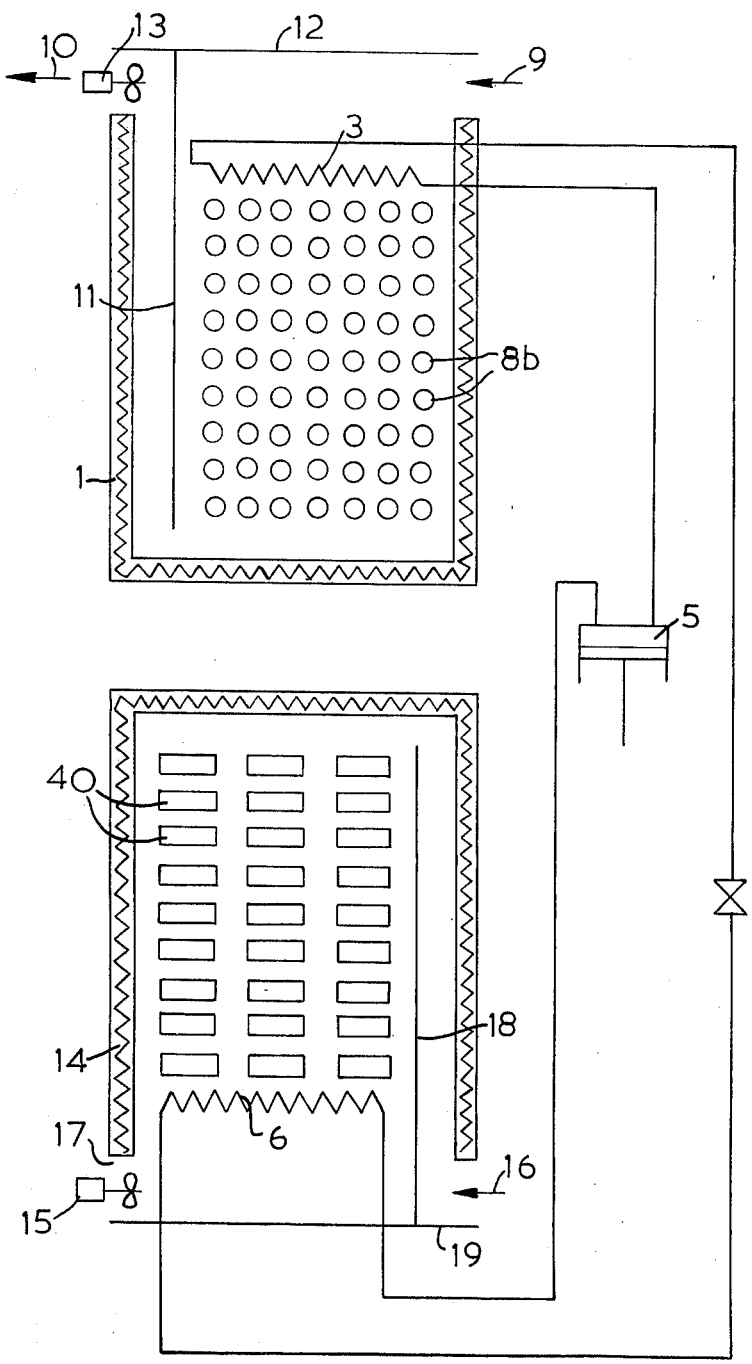

The arrangement shown in FIG. 2 is virtually identical to that shown in FIG. 1. The sole difference is that the hot store 14 contains not a crystallisable salt hydrate but refractory bricks 40. These bricks 40 are stacked one upon the other in rows. It will be readily apparent that whilst refractory bricks have a high thermal storage capacity, only the heat stored in the bricks can be extracted. Unlike the crystallisable salt hydrate, it is obviously not possible to obtain any latent heat of fusion or heat of crystallisation from these bricks. Nevertheless, under certain circumstances the use of refractory bricks may be more advantageous than utilising a crystallisable salt hydrate. Thus, if the apparatus is not required to have an extremely high heat storage density, it is easier to manufacture an apparatus using bricks rather than containers of a crystallisable salt hydrate. Moreover, refractory bricks may be heated to a higher temperature by an auxiliary heating element.

It will also be recalled that the storage vessel 14 is a hot store, heat being obtained from this store by cooling the contents of the containers 8a from an elevated temperature to their recrystallisation temperature. It is therefore extremely desirable to ensure that substantially uniform cooling of the containers throughout the hot store takes place. It has been found that if a storage vessel has containers located therein, and air is passed over these containers, the containers near the inlet are cooled more rapidly than those near the outlet. This is obviously undesirable since less heat is obtainable, in practice, from the containers near the outlet.

Figure 3:
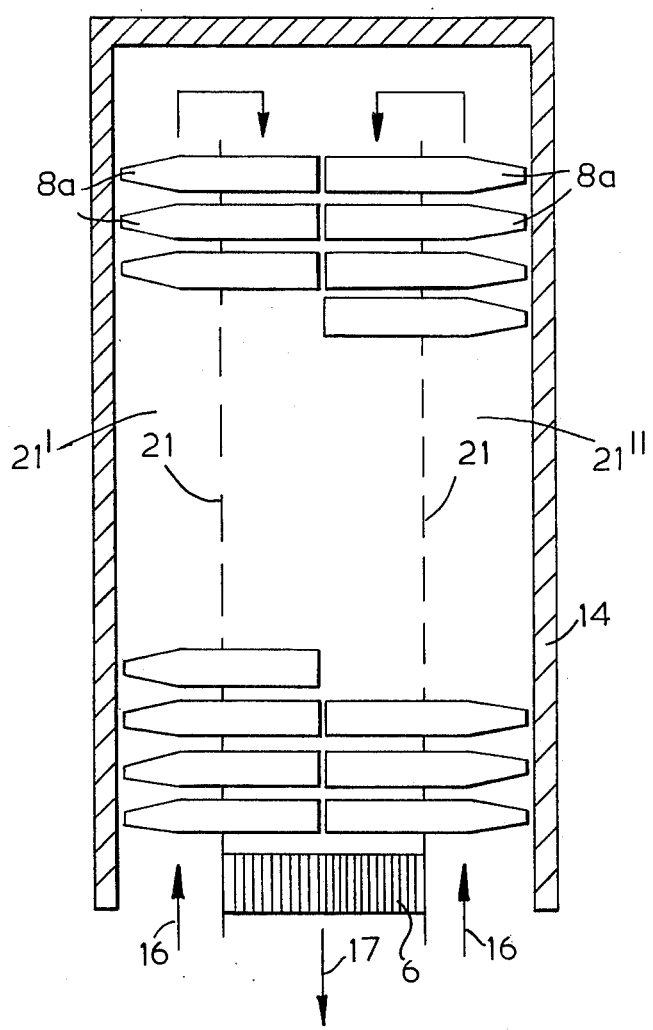
FIG. 3 is a schematic longitudinal section through a storage vessel forming part of a thermal storage apparatus in accordance with the present invention.

FIG. 3 shows a design of a storage vessel which is intended to overcome this disadvantage. For ease of understanding and for the sake of clarity, FIG. 3 will be taken as illustrating the storage vessel 14 shown in FIG. 1. However, the design is equally applicable to the storage vessel 1 shown in that Figure. Thus referring to FIG. 3, it will be seen that storage vessel 14 is cylindrical and is open at one end. The walls of the storage vessel are made of a thermally insulating material. In the central region of the open end of the storage vessel 14, there is shown the external heat exchanger 6. The annular space around the heat exchanger 6 constitutes the air inlet 16. The side walls of the heat exchanger 6 have extension portions 21 which project into the storage vessel 14. These extension portions 21 constitute a baffle. Within the interior of the storage vessel 14, a plurality of containers 8a are provided. These containers 8a extend substantially from the centre of the storage vessel to the peripheral wall. The containers 8a pass through the extension portions 21 into an annular channel 21' defined between wall 14 and extension portion 21. It will be assumed that the contents of the containers 8a are at a temperature above their crystallisation temperature. In use, a fan (not shown), causes air to pass into the inlet 16 and then flow over those outer parts of containers 8a present in annular channel 21'. When it has heated the region of the closed end of the storage vessel 14, the air passes over the end of the extension portion 21 and (as shown) flows down the central passage 21" defined by the extension portion 21. After passing over the inner portions of the containers 8a contained in passage 21", the air leaves the storage vessel through the outlet 17, over the heat exchanger 6. Such an arrangement encourages substantially uniform cooling of the contents of the containers througout the storage vessel. When the air enters channel 21' via inlet 16, the nearer the containers 8a to the inlet, the more efficiently are their outer portions cooled by the flow through channel 21'. However, it must be remembered that whilst the air is flowing through channel 21', heat transfer will be taking place within each individual container 8a, and the cooling effect on the outer ends of the containers is transmitted along each individual container by conduction and/or convection to their inner ends and vice versa. Obviously, the more container portions the air has passed over, the hotter the air will become and the less cooling effect it will have on subsequent containers. Hence, because the order in which the containers are passed by the air flow in channel 21' is reversed in channel 21", it will be appreciated that the nearer a container is to the open end of the vessel 14, the less efficient will be the cooling effect on its inner portion. It will be appreciated that there is a tendency for the different cooling effects at different portions of the container to tend to cancel one another out and in practice, it is found that the net heating effect produced by each container is more or less the same throughout the vessel. This represents the most efficient heating situation for the system as a whole.

In the embodiment shown in FIG. 3, the base plate has been omitted for the sake of clarity.

It will be readily appreciated that FIG. 2 could also show a schematic longitudinal cross-sectional through a storage vessel of rectangular cross-section. In such a case, the vessel would have two inlets instead of the annular inlet described above. Moreover, the containers 8a within the vessel could be aligned in both horizontal and vertical rows.

Figure 4:
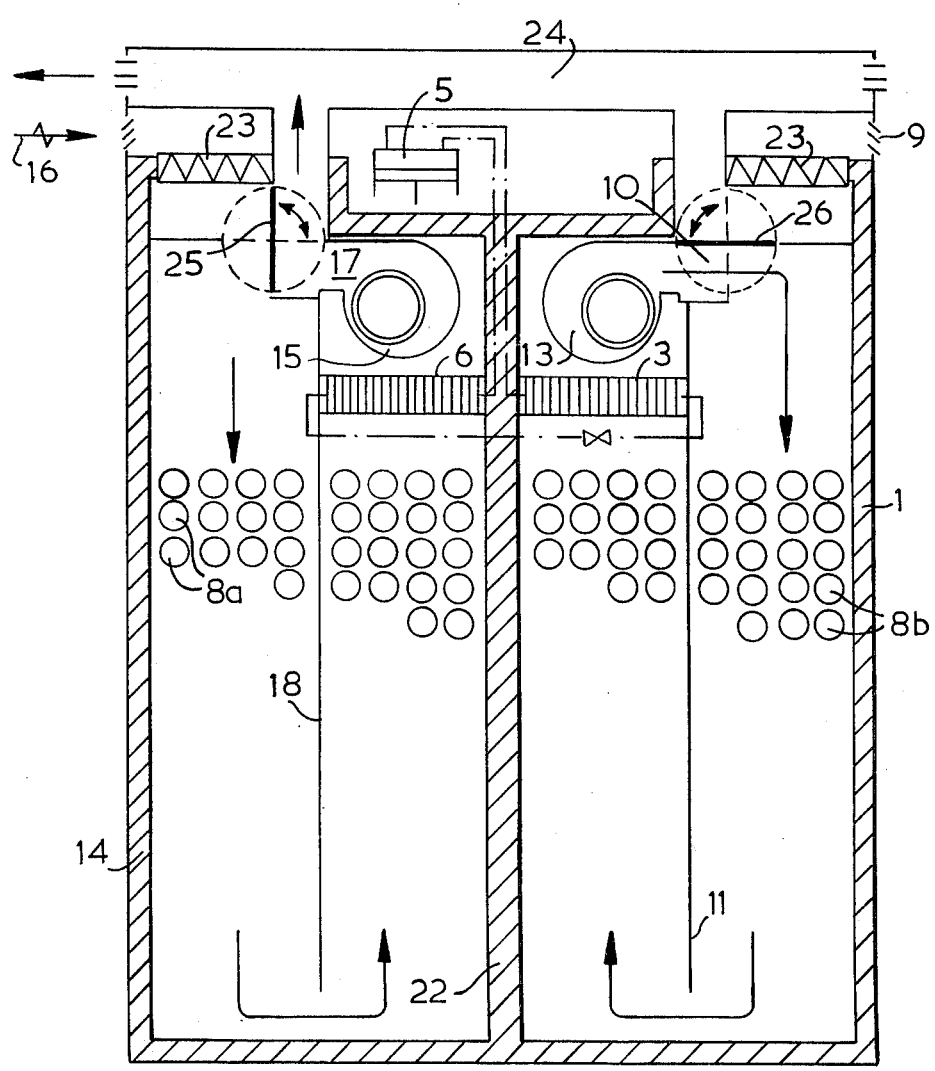
FIG. 4 is a schematic longitudinal section through a modified thermal storage apparatus in accordance with the present invention.

In FIG. 4, there is shown a further embodiment of a thermal storage apparatus in accordance with the present invention. In the arrangement shown in FIG. 4, the storage vessels 1 and 14 are made integrally with one another, and share a common dividing wall 22. It will be quickly seen that, with the exception of constructional detail, the arrangement shown in FIG. 4 is very similar to that shown in FIG. 1. Thus, referring to FIG. 4, in the storage vessel 1, there are provided containers 8b containing a freezable liquid. Air passes the cold store through an inlet 9 and is caused to circulate over the containers 8b along set paths due to the presence of a baffle 11. After having passed over the containers 8b and prior to leaving the storage vessel 1, the air passes over an evaporator 3. The evaporator 3 forms part of a refrigerant circuit which contains, in series with the evaporator 3, a compressor 5, and an external heat exchanger 6 and a pressure reduction device 7. The external heat exchanger 6 is located substantially adjacent the outlet 17 with respect to the air flow, of the second storage vessel 14. The second storage vessel 14 again contains a crystallisable salt hydrate. The second storage vessel 14 also has an air inlet 16 and an air outlet 17, the path of the air through the second storage vessel being determined by the presence of a baffle 18. Adjacent the inlet of each of the two storage vessels, a filter 23 is provided. If desired, the air leaving each of the two storage vessels may flow into a common conduit 24. Adjacent the outlet of each storage vessel is a fan indicated by reference numeral 13 in the vessel 1 and 15 in the vessel 14. Associated with each fan is a damper. The damper in the hot store is referenced 25 and the damper in the cold store is indicated by reference numeral 26.

Each of the dampers 25 and 26 is movable between two positions.

In the situation shown in FIG. 3, the damper 25 is open whilst the damper 26 is closed. The alternative positions of the damper are shown in broken lines. It will be observed that if the damper 25 is in its open position (as shown in FIG. 4) air will enter through the inlet 16, be directed towards the base of the storage vessel 14, pass around the end of the baffle 18 and then pass upwardly towards outlet 17 of the storage vessel 14. After passing over the external heat exchanger 6, the air is discharged by the fan 15. Due to the open position of the damper 25, the air can only pass into the outlet conduit 24.

If the cold store 1 is now studied, it will be observed that, in the closed position, as shown, of the damper 26, any air passing through the inlet 9 cannot enter the storage vessel 1 and is merely discharged through the outlet 10. Accordingly, in this position of the damper 26, the fan 13 in the storage vessel 1 merely recirculates the air that is already present within the storage vessel 1. However, heat transfer can still take place between the evaporator 3 and the containers 8b through the intermediary of the air.

In the arrangement shown in FIG. 4, heating is being provided for a room by air flowing freely through the storage vessel 14. If the compressor 5 is functioning, the air within the storage vessel 1 which is the cold store, is cooled by the evaporator 3. This cooled air is circulated by the fan over the containers 8b in the storage vessel 1. This causes the freezable liquid in the containers 8b to freeze. In alternative embodiments in which the freezable liquid is a crystallisable salt hydrate which crystallises at low temperatures, such cooling will cause the salt hydrate within the storage vessel 1 to crystallise.

Figure 5:
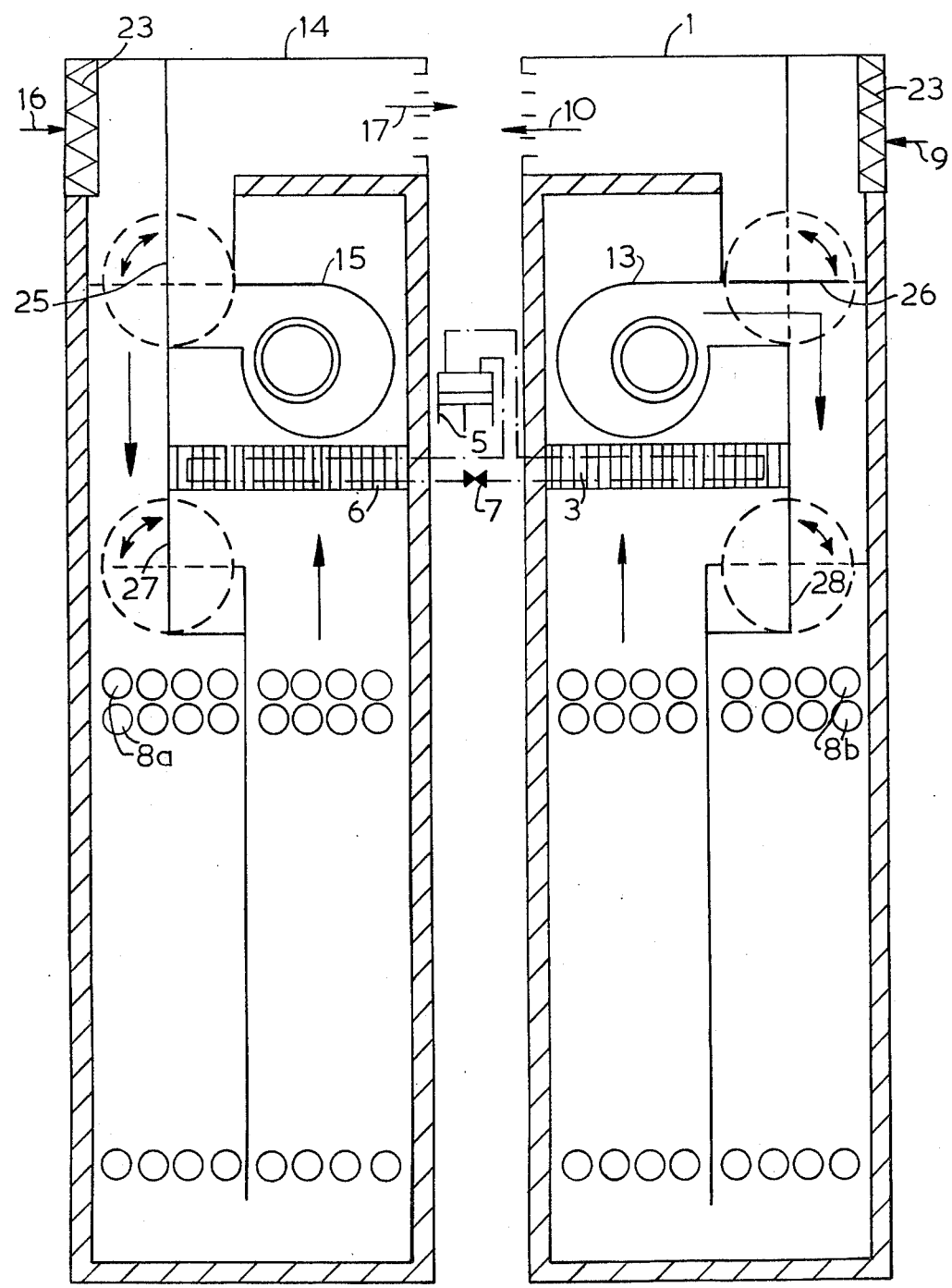
FIG. 5 is a schematic longitudinal section through a further embodiment of a thermal storage apparatus in accordance with the present invention.

FIG. 5 shows a still further embodiment of the thermal storage apparatus in accordance with the present invention. The arrangement shown in FIG. 5 is basically similar to that shown in FIG. 4, with the exception that the two storage vessels 1 and 14 are no longer made integrally with one another. In addition, four dampers 25 and 27 and 26 and 28 are provided within the storage vessels 14 and 1 respectively. As shown in FIG. 5, any air entering the inlet 9 of the storage vessel 1 can only pass directly to the outlet 10 due to the position of the damper 26. However, within the storage vessel 1 itself, the damper 28 permits the fan to circulate the air already present in the storage vessel continuously over the containers 8b. In the storage vessel 14, however, by virtue of the position of the dampers 25 and 27, fresh air enters the inlet, circulates over the containers and then passes over the heat exchanger 6 and out through the outlet. If, however, the lower damper 27 is partially closed, some of the air continues to pass over the containers 8a whilst the remainder is directed over the heat exchanger 6, bypassing the containers 8a. Obviously, if the damper 27 is fully closed, all of the air will by-pass the containers 8a and flow directly over the heat exchanger 6. This reduces the heating of the air but does not affect the heat stored in the contents of the containers 8a within the vessel 14. However, in such a case the vessel 14 is not being used as a thermal storage apparatus. It will therefore be apparent that this arrangement enables the storage apparatus to be controlled, with regard to the amount of heat to be supplied to a room. By effecting corresponding movement of the damper 28 in the storage vessel the amount of heat extracted from a room can be controlled. Nevertheless, air passing over the heat exchanger 6 will extract heat therefrom. The refrigerant passing through the heat exchanger 6 will thus be cooled, and this will affect the contents of the containers 8b within the storage vessel 1. Moreover, by regulating the volume of the air flow through the appropriate vessel 14 or 1 by partially closing the dampers 25 or 26 respectively, it is possible to further control the heat supplied to or extracted from a room.

Figure 6:
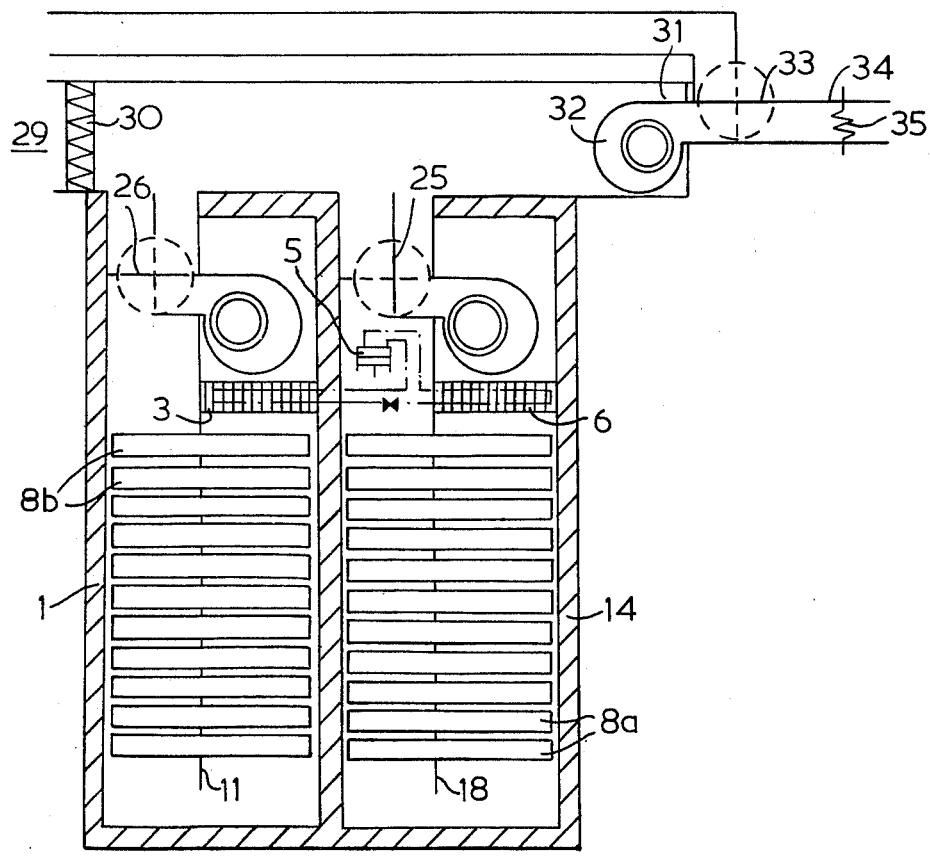
FIG. 6 is a schematic longitudinal section through a thermal storage apparatus similar to that shown in FIG. 4 but having minor constructional differences relative thereto.

FIG. 6 shows a further embodiment of a thermal storage apparatus in accordance with the present invention. This embodiment is basically similar to that shown in FIG. 4, but has several minor constuctional differences. Thus, the two storage vessels 1 and 14 have a common air inlet 29, in which a filter 30 is provided. A common outlet 31 is also provided having an additional fan 32 located therein. In the outlet from the fan, a further adjustable damper 33 is provided. This damper 33, in the position shown, directs air from the outlet 31 into a room through a conduit 34. In the conduit 34, a heating element 35 is provided for supplementing the heat output from the storage vessel 14. This heating element 35 could be a gas burner. The fan 32 is employed for overcoming external resistances to the air flow. In the alternative position of the damper 33, shown in broken lines, the air leaving the outlet 31 is directed into a conduit 36 which leads to the exterior of a building. Thus, heat can be rejected to the exterior of a building in warm weather.

By suitably adjusting the position of the dampers 25 and 26, the apparatus shown in FIG. 6 can be used for heating, cooling ventilating or dehumidifying a room. Thus, if both dampers are in the positions shown in full lines, air is circulating over the containers 8a in the storage vessel 14 and the air leaving outlet 31 will be hot with respect to the air entering the inlet 29. Similarly, if the dampers 25 and 26 are both in the positions shown in broken lines, air is circulating within the storage vessel 1. The air leaving the outlet 31 will thus be cool. Ventilation is achieved if the damper 26 is in its position shown in full lines and the damper 25 is in its position shown in broken lines. Air thus passes directly from the inlet 29 to the outlet 31. If the damper 25 is in its position shown in full lines and the damper 26 is in its position shown in broken lines, the air entering the inlet 29 will pass over both the containers 8a and 8b. In passing over the containers 8a, the air will be dehumified. External air could also be passed through the storage vessel 1 to extract heat from external air.

Figure 7:
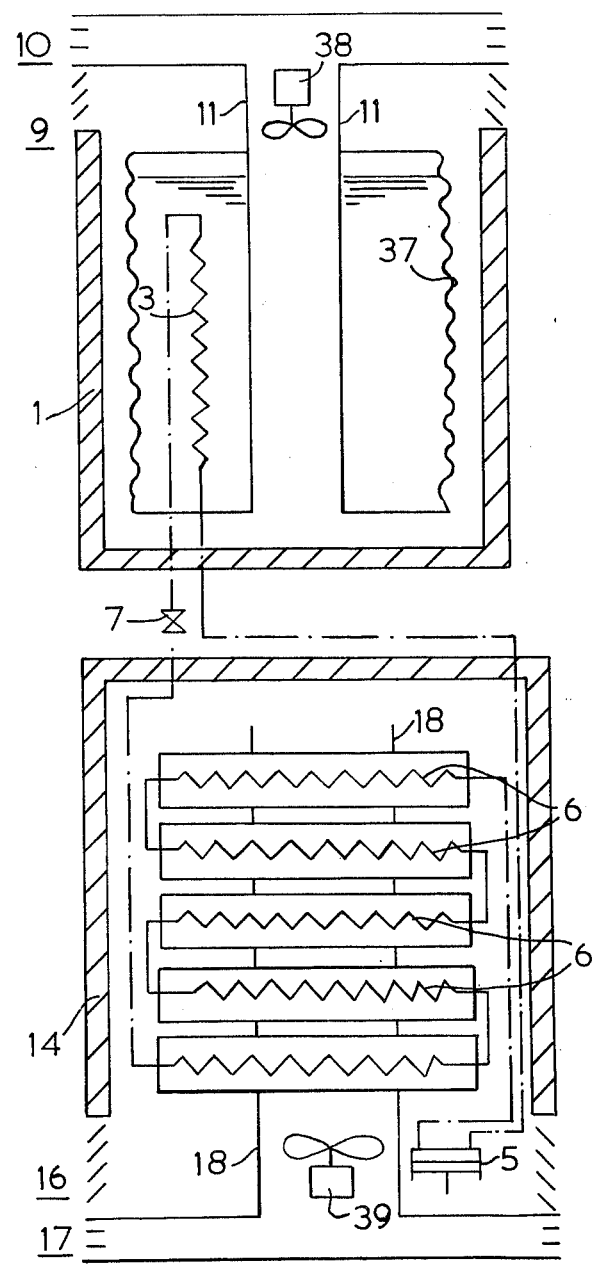
FIG. 7 is a schematic view of a thermal storage apparatus similar to that shown in FIGS. 1 and 2 but having minor constructional differences relative thereto.

Similarly, FIG. 7 shows an embodiment of a thermal storage apparatus similar to that shown in FIGS. 1 and 2. Again, minor constructional differences can be observed. Thus, within the storage vessel 1, a single container 37 is provided. The evaporator 3 is located within the container 37. The container 37 has a corrugated external surface so as to produce as large as possible heat transfer area using a single container. It will also be observed that the external heat exchanger 6 comprises a plurality of heat exchangers in series, each component heat exchanger being located with a container 8a. Fans 38 and 39 are provided to cause air flow within the vessels 1 and 14 respectively.

Finally, it should be noted that whenever the term "fan" has been employed herein before, the fan may be either of the fixed speed or variable speed type. The term "fan" also includes, within its scope a blower. Similarly, the evaporator 3 and the heat exchanger 6 may each be either on the inlet or the outlet side of the fan in the relevant storage vessel. Furthermore, an additional heating element may be provided in either store or in the air outlet or outlets either to heat the interior of the storage vessels or to increase the temperature of the air being discharged.

I claim:

1. A thermal storage apparatus comprising a first thermal storage vessel containing a first thermal storage medium, which is capable of being maintained at a temperature below a pre-selected temperature, a second thermal storage vessel containing a second thermal storage medium, which is capable of being maintained at a temperature above said pre-selected temperature, and a refrigeration system for transferring heat from said first storage vessel to said second storage vessel, said second storage thermal medium in said second storage vessel comprises at least one crystallisable salt hydrate of the formula $S . x H_2O$ having a crystallisation temperature in excess of said pre-selected temperature, said hydrate having the characteristic of at least partially dissociating at a temperature above its crystallisation temperature according to the equation $S . x H_2O \rightarrow S . y H_2O + (x-y) H_2O$, wherein $y$ is not greater than $x$ and may be zero, said compound $S . y H_2O$ being at least partially soluble in said $(x-y) H_2O$, said dissolution occurring with the absorbtion of heat, said $S . y H_2O$ and said $(x-y) H_2O$ recombining on cooling to said crystallisation temperature with the evolution of heat to reform said $S . x H_2O$.

2. A thermal storage apparatus as recited in claim 1, wherein said refrigeration system is a vapour compression system comprising, in series, an evaporator, a compressor, a pressure reduction device and a heat exchanger, said heat exchanger being located within said second storage vessel and said evaporator being located within said first storage vessel.

3. A thermal storage apparatus as recited in claim 1, wherein said at least one crystallisable salt hydrate is selected from the group consisting of trisodium(ortho)phosphate dodecahydrate, a mixture of trisodium(ortho)phosphate dodecahydrate and disodium hydrogen phosphate dodecahydrate, sodium carbonate heptahydrate, sodium carbonate decahydrate, sodium sulphate decahydrate, sodium thiosulphate pentahydrate, sodium acetate trihydrate, calcium chloride hexahydrate and a mixture of hydrated sodium silicate and sodium carbonate decahydrate.

4. A thermal storage apparatus as recited in claim 1, wherein said second storage medium contains water in addition to said crystallisable salt hydrate, said water being present in a quantity just sufficient to ensure complete dissolution of said $S . y H_2O$, said quantity being insufficient to prevent crystallisation of said $S . z H_2O$ on cooling.

5. A thermal storage apparatus as recited in claim 1, wherein both said storage vessels are open to the atmosphere, each said storage vessel having means for circulating air through the storage vessel.

6. A thermal storage apparatus as recited in claim 1, wherein each of said storage vessels is provided with auxiliary heating means, said heating means being in thermal communication with the interior of said storage vessel.

7. A thermal storage apparatus as recited in claim 1, wherein said refrigeration system is one of an adsorption refrigeration system and a thermoelectric refrigeration system which operates utilising the Peltier effect.

8. A thermal storage apparatus as recited in claim 1, wherein said heat pump comprises a vapour compression refrigeration system containing a refrigerant, said system comprising, in series, an evaporator, a compressor, a pressure reduction means and a heat exchanger, said heat exchanger being located within said second storage vessel, said heat exchanger being communicatable with a heat sink for rejecting excess heat from said second storage vessel.

9. A thermal storage apparatus as recited in claim 1, wherein said storage medium in said first storage vessel is a liquid, said liquid having the characteristic of solidifying, with the evolution of heat, at a temperature which is below said pre-selected temperature.

10. A thermal storage apparatus as recited in claim 9, wherein said liquid is selected from the group consisting of water, an aqueous solution of a salt, a crystallisable salt hydrate and a mixture of crystallisable salt hydrates.

11. A thermal storage apparatus as recited in claim 9, wherein said freezable liquid comprises at least one crystallisable salt hydrate selected from the group consisting of a eutectic mixture of hydrates of sodium sulphate and ammonium chloride, and a hydrate of sodium silicate.

12. A thermal storage apparatus comprising a first thermal storage vessel, a plurality of containers in said first storage vessel, each said container containing a thermal storage medium selected from the group consisting of water, an aqueous solution of a salt, a crystallisable salt hydrate and a mixture of crystallisable salt hydrates, said storage medium in said second storage vessel having the characteristic of solidifying with the evolution of heat at a temperature below a pre-selected temperature, a second thermal storage vessel, a plurality of containers in said second storage vessel, each container containing a thermal storage medium in the form of a crystallisable salt hydrate selected from the group consisting of trisodium(ortho)phosphate dodecahydrate a mixture of trisodium(ortho)phosphate dodecahydrate and disodium hydrogen phosphate dodecahydrate, sodium carbonate decahydrate, sodium sulphate decahydrate, and a mixture of hydrated sodium silicate and sodium carbonate decahydrate, and a refrigeration system comprising, in series, an evaporator, a compressor, a pressure reduction device and a heat exchanger, said heat exchanger being located within said second storage vessel and said evaporator being located within said first storage vessel.

13. A thermal storage apparatus as recited in claim 12, wherein said refrigeration system operates to tend to cause one of said storage media to pass from its solid state to its liquid state whilst simultaneously tending to cause said other storage medium to pass from its liquid state to its solid state.

* * * * *